United States Patent
Carbone et al.

(10) Patent No.: US 9,625,890 B2
(45) Date of Patent: Apr. 18, 2017

(54) COORDINATING CONTROL LOOPS FOR TEMPERATURE CONTROL

(71) Applicant: Intel Corporation, Santa Clara, CA (US)

(72) Inventors: Mark Carbone, Cupertino, CA (US); Catharina R. Biber, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 370 days.

(21) Appl. No.: 14/229,336

(22) Filed: Mar. 28, 2014

(65) Prior Publication Data

US 2015/0277454 A1    Oct. 1, 2015

(51) Int. Cl.
| | |
|---|---|
| G05B 13/02 | (2006.01) |
| G05B 15/02 | (2006.01) |
| G06F 1/20 | (2006.01) |
| G06F 1/32 | (2006.01) |

(52) U.S. Cl.
CPC .............. *G05B 15/02* (2013.01); *G06F 1/203* (2013.01); *G06F 1/206* (2013.01); *G06F 1/3234* (2013.01); *G06F 1/3296* (2013.01); *Y02B 60/1275* (2013.01); *Y02B 60/1285* (2013.01)

(58) Field of Classification Search
None
See application file for complete search history.

(56) References Cited

U.S. PATENT DOCUMENTS

| | | | | |
|---|---|---|---|---|
| 7,036,030 | B1 * | 4/2006 | Altmejd | G06F 1/3228 713/322 |
| 2004/0193822 | A1 * | 9/2004 | Kareenahalli | G06F 1/3203 711/167 |
| 2006/0137377 | A1 * | 6/2006 | Samson | G06F 1/206 62/259.2 |
| 2007/0191993 | A1 | 8/2007 | Wyatt | |
| 2008/0106322 | A1 | 5/2008 | Jeong | |
| 2010/0235014 | A1 | 9/2010 | Liao et al. | |
| 2011/0320061 | A1 | 12/2011 | Chen | |

FOREIGN PATENT DOCUMENTS

| | | |
|---|---|---|
| KR | 10-0806609 B1 | 2/2008 |
| WO | 2006-072097 A2 | 7/2006 |

OTHER PUBLICATIONS

International Search Report and Written Opinion received for International Patent Application No. PCT/US2015/020124, mailed on May 28, 2015, 20 pages.
International Preliminary Report on Patentability received for International Application No. PCT/US2015/020124, mailed on Oct. 13, 2016, 17 pages.

* cited by examiner

*Primary Examiner* — Wissam Rashid
(74) *Attorney, Agent, or Firm* — Alpine Technology Law Group LLC

(57) ABSTRACT

In one example a controller comprises logic, at least partially including hardware logic, configured to define a control relationship between a first control loop associated with a first heat source and a second control loop associated with a second heat source and enforce the control relationship during throttling operations of the first heat source and the second heat source. Other examples may be described.

16 Claims, 11 Drawing Sheets

FIG. 1  Electronic Device 100

COORDINATING CONTROL LOOPS FOR TEMPERATURE CONTROL

RELATED APPLICATIONS

None.

BACKGROUND

The subject matter described herein relates generally to the field of electronic devices and more particularly to coordinating control loops for temperature control in electronic devices.

Electronic devices include multiple components that generate heat. The heat emitted by these components may be regulated or managed by separate control loops. For example, many electronic devices include charging circuitry and multiple heat-generating electronic components. A first control loop may manage operating parameters of the charging circuitry in response to thermal conditions and a second control loop may manage operations of electronic components. Accordingly techniques for coordinating control loops for temperature control may find utility, e.g., in electronic devices.

BRIEF DESCRIPTION OF THE DRAWINGS

The detailed description is described with reference to the accompanying figures.

DETAILED DESCRIPTION

Described herein are exemplary systems and methods to coordinate control loops for temperature control in electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As described above, it may be useful to coordinate control loops for temperature control in electronic devices such as computer systems, tablet computing devices, mobile phones, electronic readers, and the like. The subject matter described herein addresses these and other issues by providing a controller which comprises logic, at least partially including hardware logic, configured to define a control relationship between a first control loop associated with a first heat source and a second control loop associated with a second heat source and enforce the control relationship during throttling operations of the first heat source and the second heat source.

Figure 1:
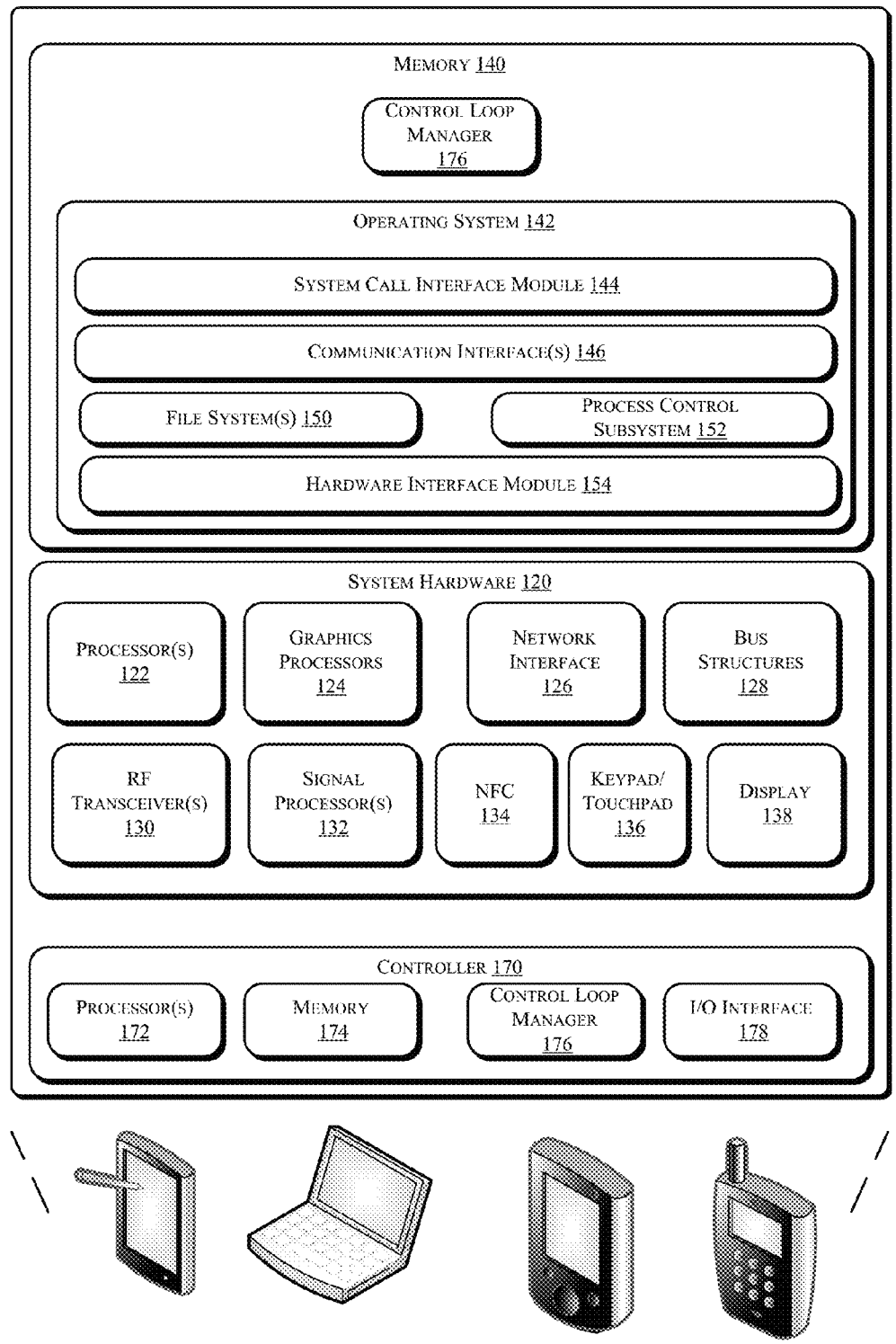
FIG. 1 is a schematic illustration of an electronic device which may be adapted to coordinate control loops for temperature control in accordance with some examples.

FIG. 1 is a schematic illustration of an electronic device 100 which may be adapted to coordinate control loops for temperature control in accordance with some examples. In various examples, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage devices. Alternatively, the file store may also be external to electronic device 100 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/ GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 100 may further include one or more input/output interfaces such as, e.g., a keypad 136 and a display 138. In some examples electronic device 100 may not have a keypad and use the touch panel for input.

Memory 140 may include an operating system 142 for managing operations of electronic device 100. In one embodiment, operating system 142 includes a hardware interface module 154 that provides an interface to system hardware 120. In addition, operating system 140 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some examples an electronic device may include a controller 170, which may comprise one or more controllers that are separate from the primary execution environment. The separation may be physical in the sense that the controller may be implemented in controllers which are physically separate from the main processors. Alternatively, the trusted execution environment may logical in the sense that the controller may be hosted on same chip or chipset that hosts the main processors.

By way of example, in some examples the controller 170 may be implemented as an independent integrated circuit located on the motherboard of the electronic device 100, e.g., as a dedicated processor block on the same SOC die. In other examples the trusted execution engine may be implemented on a portion of the processor(s) 122 that is segregated from the rest of the processor(s) using hardware enforced mechanisms or as logic instructions which may be executed on a processor in the user space or kernel of the operating system.

In the embodiment depicted in FIG. 1 the controller 170 comprises a processor 172, a memory module 174, a control loop manager 176, and an I/O interface 178. In some examples the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the controller 170 is separate from the main processor(s) 122 and operating system 142, the controller 170 may be made secure, i.e., inaccessible to hackers who typically mount software attacks from the host processor 122. In some examples the control loop manager 176 may reside in the memory 140 of electronic device 100 and may be executable on one or more of the processors 122.

Figure 2:
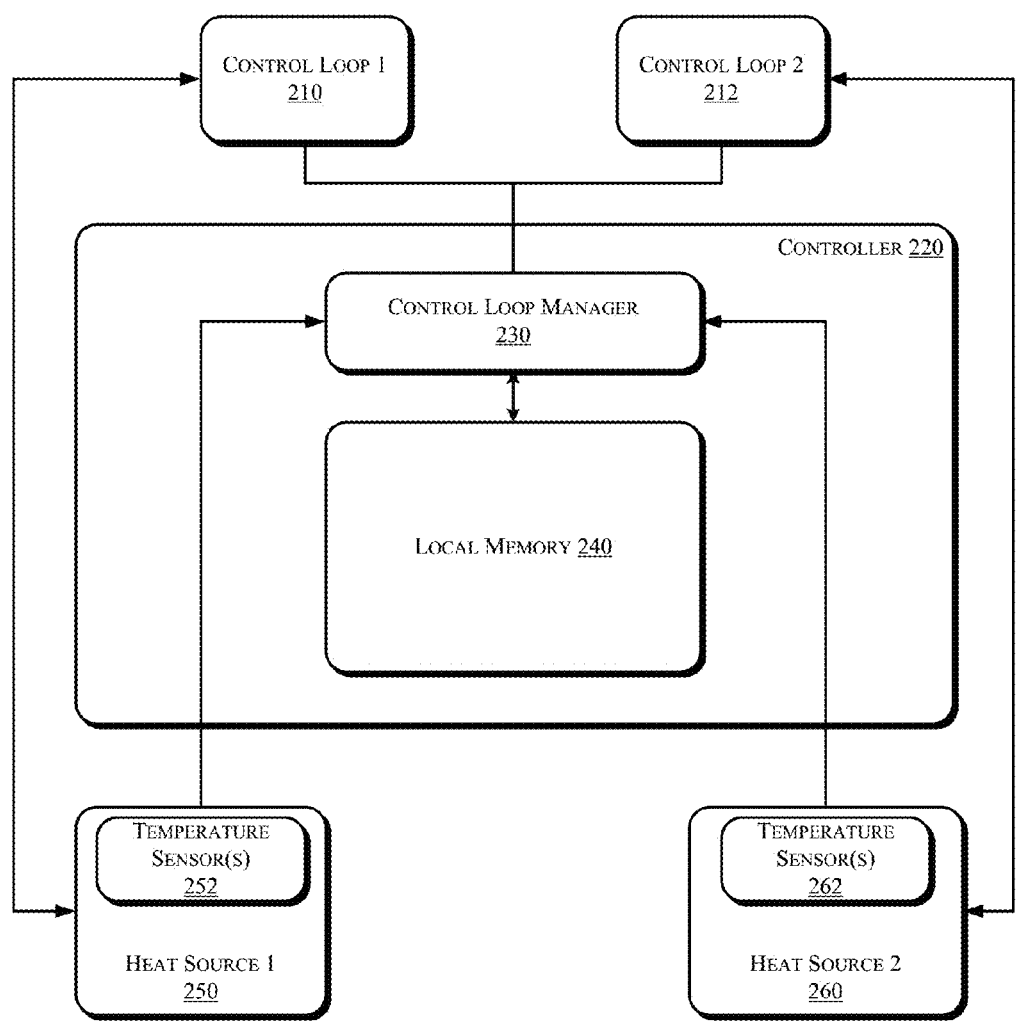
FIG. 2 is a high-level schematic illustration of an exemplary architecture to coordinate control loops for temperature control in accordance with some examples.

In some examples the control loop manager 176 interacts with one or more other components of the electronic device 100 to coordinate control loops for temperature control in electronic devices. FIG. 2 is a high-level schematic illustration of an exemplary architecture to coordinate control loops for temperature control in accordance with some examples. Referring to FIG. 2, a controller 220 may be embodied as general purpose processor 122 or as a low-power controller such as controllers 170. Controller 220 may comprise a control loop manager 230 to manage control loop operations and a local memory 240. As described above, in some examples the control loop manager 230 may be implemented as logic instructions executable on controller 220, e.g., as software or firmware, or may be reduced to hard-wired logic circuits. Local memory 240 may be implemented using volatile and/or non-volatile memory.

Controller 220 may be communicatively coupled to one or more temperature sensors on one or more local heat sources. In the example depicted in FIG. 2 the controller 220 is communicatively coupled to a first temperature sensor 252 on or near a first heat source 250 and a second sensor 262 on or near a second heat source 260. Heat sources 250, 260 may comprise one or more electronic components which generate heat. For example, heat sources 250, 260 may comprise one or more integrated circuits devices, displays, power supplies, or the like. Temperature sensors 252, 262 may comprise one or more thermistors, thermocouples, or other temperature sensor. These sensors may also be virtual, i.e. a temperature inferred from other information.

Control loop manager 230 may be communicatively coupled to one or more control loops which control operations of the heat source(s) 250, 260. In the example depicted in FIG. 2 the control loop manager 230 is coupled to a first control loop 210 and a second control loop 212. First control loop is, in turn, coupled to first heat source 250 and second control loop 212 is, in turn, coupled to second heat source 260.

Having described various structures of a system to implement ?? in electronic devices, operating aspects of a system will be explained with reference to FIGS. 3A-3C, which are flow charts illustrating operations in a method to coordinate control loops for temperature control in electronic devices, and FIGS. 4-5. The operations depicted in the flowchart of FIG. 4 may be implemented by the control loop manager 330, alone or in combination with other components of electronic device 100.

Figure 3A:
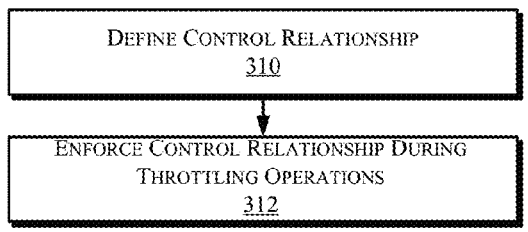
FIGS. 3A-3C are flowcharts illustrating operations in a method to coordinate control loops for temperature control in accordance with some examples.

FIG. 3A is a flowchart illustrating at a high-level operations in a method to coordinate control loops for temperature control in electronic devices. Referring to FIG. 3A, at operation 310 the control loop manager 330 defines a control relationship between the first control loop 210 and the second control loop 212. At operation 312 the control loop manager 330 enforces the control relationship between the control loops during throttling operations of the heat sources.

In some examples, the control loops 210, 212 may be incorporated into control loop manager 230. In the example depicted in FIG. 2 the control loops 210, 212 are implemented as separate logical entities. For example, control loops 210, 212 may be a component of a basic input/output system (BIOS) of an electronic device 100. In operation, control loops 210, 212 may throttle operations of the heat sources in response to temperatures which exceed a threshold. For example, the control loops 210, 212 may reduce an operating frequency of an integrated circuit, reduce a charging current, or reduce a brightness of a display in order to reduce the temperature of an electronic device such as electronic device 100. Conversely, the control loops 210, 212 may increase an operating speed of an integrated circuit, increase a charging current, or increase a brightness of a display when the temperature in the electronic device 100 falls below a threshold. In operation, control loop manager 230 coordinates the operations of the respective control loops 210, 212.

Figure 3C:
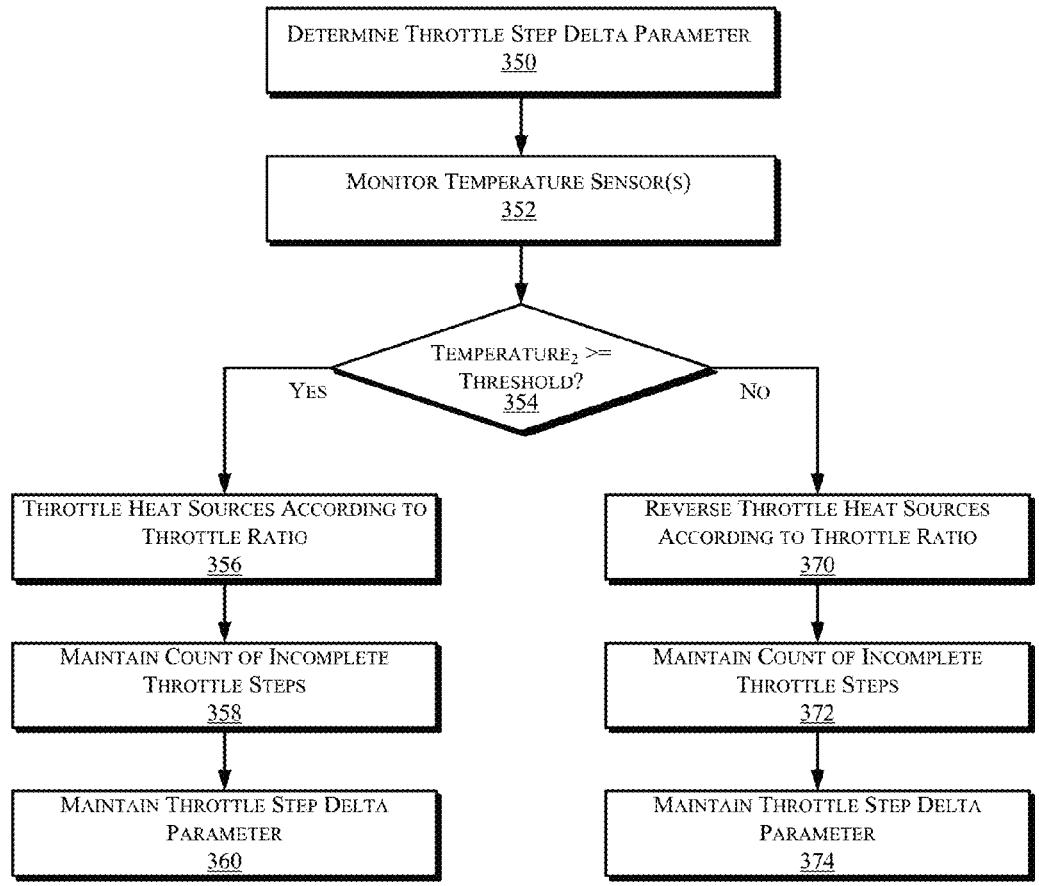
Figure 3B:
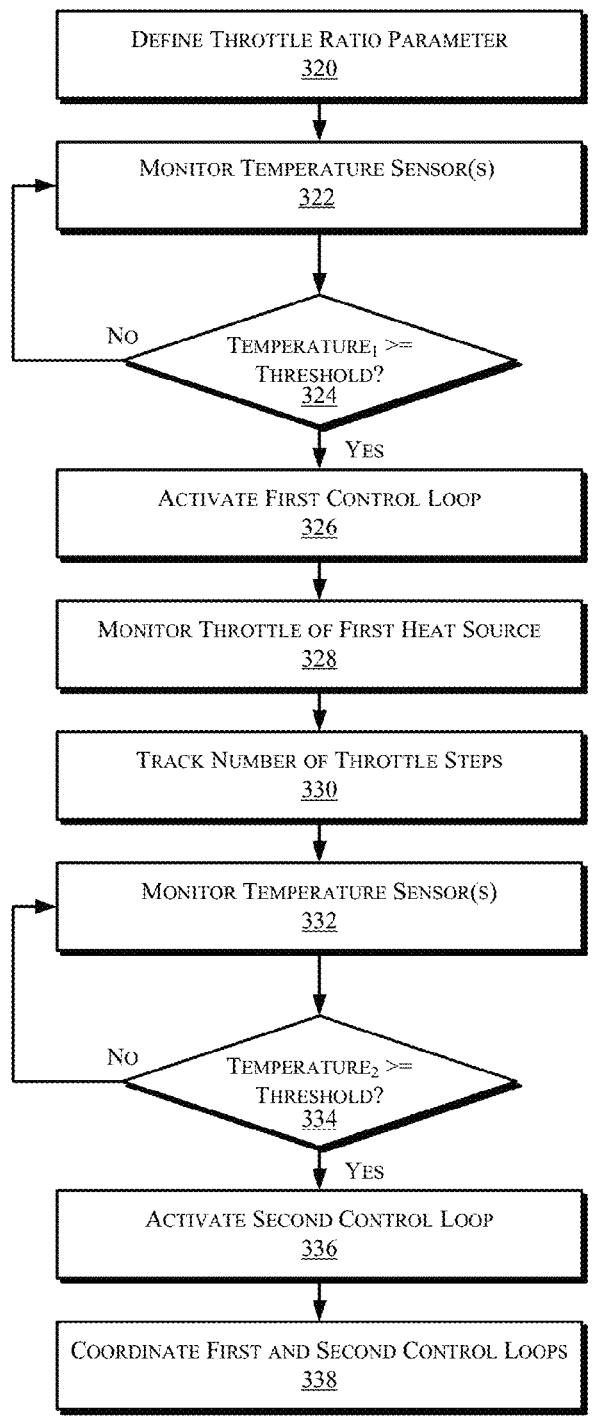

FIG. 3B illustrates in greater detail operations in a method to coordinate control loops for temperature control in electronic devices. Referring to FIG. 3B, at operation 320 a throttling ratio parameter is defined between the first control loop 210 and the second control loop. In some examples the throttle ratio parameter provides a ratio between the rate at which the first control loop 210 throttles an operating parameter of the first heat source and the rate at which the second control loop 212 throttles an operating parameter of the second heat source 260. For example, a throttle ratio parameter of 1:1 will result in a 1:1 reduction of operating parameters of the first heat source 250 and the second heat source 260. More generally, a M:N ratio will result in a M:N reduction of operating parameters of the first heat source 250 and the second heat source 260. The ratio can be non-integer.

At operation 322 the temperature sensors 252, 262 are monitored. In some examples the control loop manager 230 may receive signals directly from the temperature sensors 252, 262 on the respective heat sources 250, 260. In other examples the control loops 210, 212 may receive signals from the temperature sensors 252, 262 on the respective heat sources 250, 260.

If, at operation 324, the temperature reading of neither of the temperature sensors 252, 262 exceed a threshold and no adjustment action is required then control passes back to operation 322 and the temperature sensors continue to be monitored. In some examples the threshold(s) may be established during a configuration process for the electronic device. For example, the temperature threshold(s) may be entered into the BIOS of an electronic device. The thresholds may be static thresholds or may be dynamic thresholds that vary with changes in the environment or the device configuration.

By contrast, if at operation 324 the temperature of one of the temperature sensors 252, 262 meets or exceeds a threshold then the control loop responsible for the managing operations of the heat source that exceeded the temperature threshold is activated. For example, if the temperature detected by temperature sensor 252 exceeds a threshold then control passes to operation 326 and the first control loop is activated.

At operation 326 the first control loop may throttle operations of the first heat source in order to reduce the heat generated by the first heat source. For example, the first control loop 210 may throttle one or more operating parameters of the first heat source 250. For example, if the first heat source 250 is a processor capable of operating at multiple power levels then the first control loop 210 may reduce the operating power level of the processor. Similarly, if the first heat source 250 is charging circuitry capable of operating at multiple power levels then the first control loop 210 may reduce the operating power level of the charging circuitry. Alternatively, if the first heat source 250 is a display capable of operating at multiple brightness levels then the first control loop 210 may reduce the brightness level of the display.

At operation 328 the throttling operations of the first control loop 210 are monitored and at operation 330 the number of throttle steps taken by the first heat source 250 are tracked. For example, the first control loop 210 may monitor the throttling of the first heat source 250 and record a number of steps by which the power level of the first heat source 250 has been reduced. For example, the number of steps may be recorded in local memory 240.

At operation 332 the temperature sensors 252, 262 are monitored as in the first control loop 210. Again, in some examples the control loop manager 230 may receive signals directly from the temperature sensors 252, 262 on the respective heat sources 250, 260. In other examples the control loops 210, 212 may receive signals from the temperature sensors 252, 262 on the respective heat sources 250, 260.

If, at operation 334, the temperature reading of neither of the temperature sensors 252, 262 meets or exceeds a threshold then control passes back to operation 332 and the temperature sensors continue to be monitored.

By contrast, if at operation 334 the temperature of one of the temperature sensors 252, 262 meets or exceeds a threshold then the control loop responsible for the managing operations of the heat source that exceeded the temperature threshold is activated. For example, if the temperature detected by the second temperature sensor 252 meets or exceeds a threshold then control passes to operation 336 and the second control loop 212 is activated. The second control loop 212 may implement throttling operations on the second heat source 260 analogous to the throttling operations implemented on the first heat source 250.

At operation 338 the control loop manager 230 implements operations to coordinate the first control loop 210 and the second control loop 212. FIG. 3C is a flowchart illustrating operations implemented by control loop manager 230 to coordinate the first control loop 210 and the second control loop 212.

Referring to FIG. 3C, at operation 350 the control loop manager 230 determines a throttle step parameter. For example, the throttle step delta parameter may be set to the number of throttle steps the first control loop implemented on the first heat source. At operation 352 the temperature sensors 252, 262 are monitored as described above.

If, at operation 354 the temperature of one of the temperature sensors 252, 262 meets or exceeds a threshold then the control loop responsible for the managing operations of the heat source that exceeded the temperature threshold is activated. If the temperature detected by the second temperature sensor 252 meets or exceeds a threshold then control passes to operation 356 and the control loop manager 230 instructs the control loops 210, 212 to throttle the respective heat sources 250, 260 according to the throttle ratio defined in operation 320. For example, if the throttle ratio parameter specifies a 1:1 throttle ratio then the control loop manager 230 instructs the control loops 210, 212 to throttle the respective heat sources 250, 260 at a 1:1 ratio.

Similarly, if the throttle ratio parameter specifies a M:N throttle ratio then the control loop manager 230 instructs the control loops 210, 212 to throttle the respective heat sources 250, 260 at a M:N ratio.

At operation 358 the control loop manager 230 maintains a count of incomplete throttle step requests. If the throttle ratio parameter specifies a M:N throttling relationship then the control loop manager 230 keeps track of the number of throttle steps implemented by each control loop and the number of throttle steps necessary to maintain the ratio. For example, if the throttle ratio specifies a 3:1 ratio between the first control loop 210 and the second control loop 212 then the control loop manager tracks the number of throttle steps implemented by the first control loop, and for every three steps implemented by the first control loop 210 the second control loop implements one throttle step.

At operation 360 the control loop manager 230 instructs the control loops 210, 212 to maintain the throttle step delta parameter defined in operation 350, if possible, during throttling operations. For example, if the first control loop 210 had throttled the first heat source 350 by three steps prior to initiation of the second control loop 212, then the control manager 230 instructs the control loops 210, 212 to maintain a three-step difference between the number of throttling steps implemented in by the first control loop 210 and the second control loop 212, if possible.

By contrast, if at operation 354 the temperature of the temperature sensors 252, 262 is less than the threshold then control passes to operation 370 and the control loop manager 230 instructs the control loops 210, 212 to reverse the throttling of the respective heat sources 250, 260 according to the throttle ratio defined in operation 320. For example, if the throttle ratio parameter specifies a 1:1 throttle ratio then the control loop manager 230 instructs the control loops 210, 212 to reverse the throttling of the respective heat sources 250, 260 at a 1:1 ratio. Similarly, if the throttle ratio parameter specifies a M:N throttle ratio then the control loop manager 230 instructs the control loops 210, 212 to reverse throttle the respective heat sources 250, 260 at a M:N ratio.

At operation 372 the control loop manager 230 maintains a count of incomplete reverse throttle step requests. If the throttle ratio parameter specifies a M:N throttling relationship then the control loop manager 230 keeps track of the number of reverse throttle steps implemented by each control loop and the number of reverse throttle steps necessary to maintain the ratio. For example, if the throttle ratio specifies a 3:1 ratio between the first control loop 210 and the second control loop 212 then the control loop manager tracks the number of reverse throttle steps implemented by the first control loop, and for every three steps implemented by the first control loop 210 the second control loop implements a reverse throttle step.

At operation 360 the control loop manager 230 instructs the control loops 210, 212 to maintain the throttle step delta parameter defined in operation 350, if possible, during reverse throttling operations. For example, if the first control loop 210 had throttled the first heat source 350 by three steps prior to initiation of the second control loop 212, then the control manager 230 instructs the control loops 210, 212 to maintain a three-step difference between the number of reverse throttling steps implemented in by the first control loop 210 and the second control loop 212, if possible.

Thus, the structure depicted in FIGS. 1-2 and the operations depicted in FIGS. 3A-3C enable the control loop manager 230 to coordinate control loops for heat-generating devices in electronic devices 100. In some examples the throttle ratio parameter may be established by a designer or manufacturer of an electronic device and stored in a permanent memory in the BIOS of the device. FIGS. 4-5 are graphs illustrating throttling operations in a method to coordinate control loops for temperature control in accordance with some examples.

Figure 4:
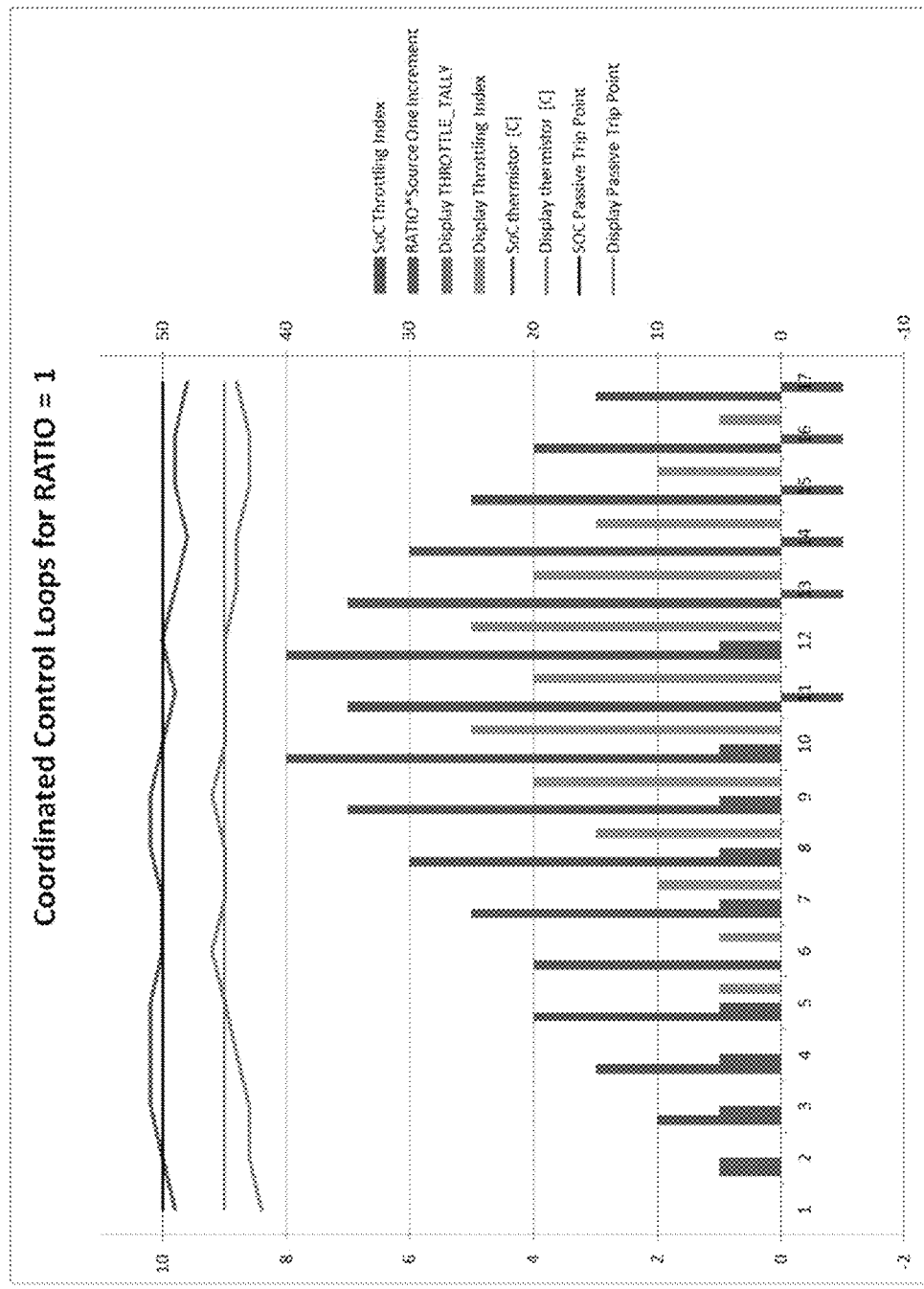
FIGS. 4-5 are graphs illustrating throttling operations in a method to coordinate control loops for temperature control in accordance with some examples.

FIG. 4 illustrates an example in which the throttle ratio parameter is set to 1:1 and the control loop manager 230 coordinates operations of a first control loop 210 which regulates operations of a system on a chip (SOC) based on input from a thermistor on the SOC and the second control loop 212 which regulates operations of a display based on input from a display thermistor.

In the example depicted in FIG. 4 the first control loop is set to throttle the SOC when the temperature at the SOC thermistor reaches 50 C. The highest power state for the SOC is P0 and the throttle step size is one P-state. The second control loop is set to throttle the display when the display hits 45 C. Table I illustrates operations of the control loop manager over time in the thermal environment.

TABLE I

| Time step | SoC thermistor [C.] | SoC Throttling Index | Display thermistor [C.] | RATIO* Source One Increment | Display Throttle Tally | Display Throttling Index |
|---|---|---|---|---|---|---|
| 1 | 49 | 0 | 42 | 0 | 0 | 0 |
| 2 | 50 | 1 | 43 | 1 | 0 | 0 |
| 3 | 51 | 2 | 43 | 1 | 0 | 0 |
| 4 | 51 | 3 | 44 | 1 | 0 | 0 |
| 5 | 51 | 4 | 45 | 1 | 0 | 1 |

At time step S the display thermistor hits 45 C and it is determined that the throttle step delta parameter (i.e., the number of p-state throttling steps minus the number of display throttling steps) is 4−1=3. Thus, the control loop manager 230 will attempt to maintain a difference of three steps between the throttle state of the two loops until the last steps of unthrottling to the highest power dissipation, as illustrated in Table II.

TABLE II

| Time step | SoC thermistor [C.] | SoC Throttling Index | Display thermistor [C.] | RATIO* Source One Increment | Display Throttle Tally | Display Throttling Index |
|---|---|---|---|---|---|---|
| 6 | 50 | 4 | 46 | 0 | 0 | 1 |
| 7 | 50 | 5 | 45 | 1 | 0 | 2 |
| 8 | 51 | 6 | 45 | 1 | 0 | 3 |
| 9 | 51 | 7 | 46 | 1 | 0 | 4 |
| 10 | 50 | 8 | 45 | 1 | 0 | 5 |
| 11 | 49 | 7 | 45 | −1 | 0 | 4 |
| 12 | 50 | 8 | 45 | 1 | 0 | 5 |
| 13 | 49 | 7 | 44 | −1 | 0 | 4 |
| 14 | 48 | 6 | 44 | −1 | 0 | 3 |
| 15 | 49 | 5 | 43 | −1 | 0 | 2 |
| 16 | 49 | 4 | 43 | −1 | 0 | 1 |
| 17 | 48 | 3 | 44 | −1 | 0 | 0 |

Figure 5:
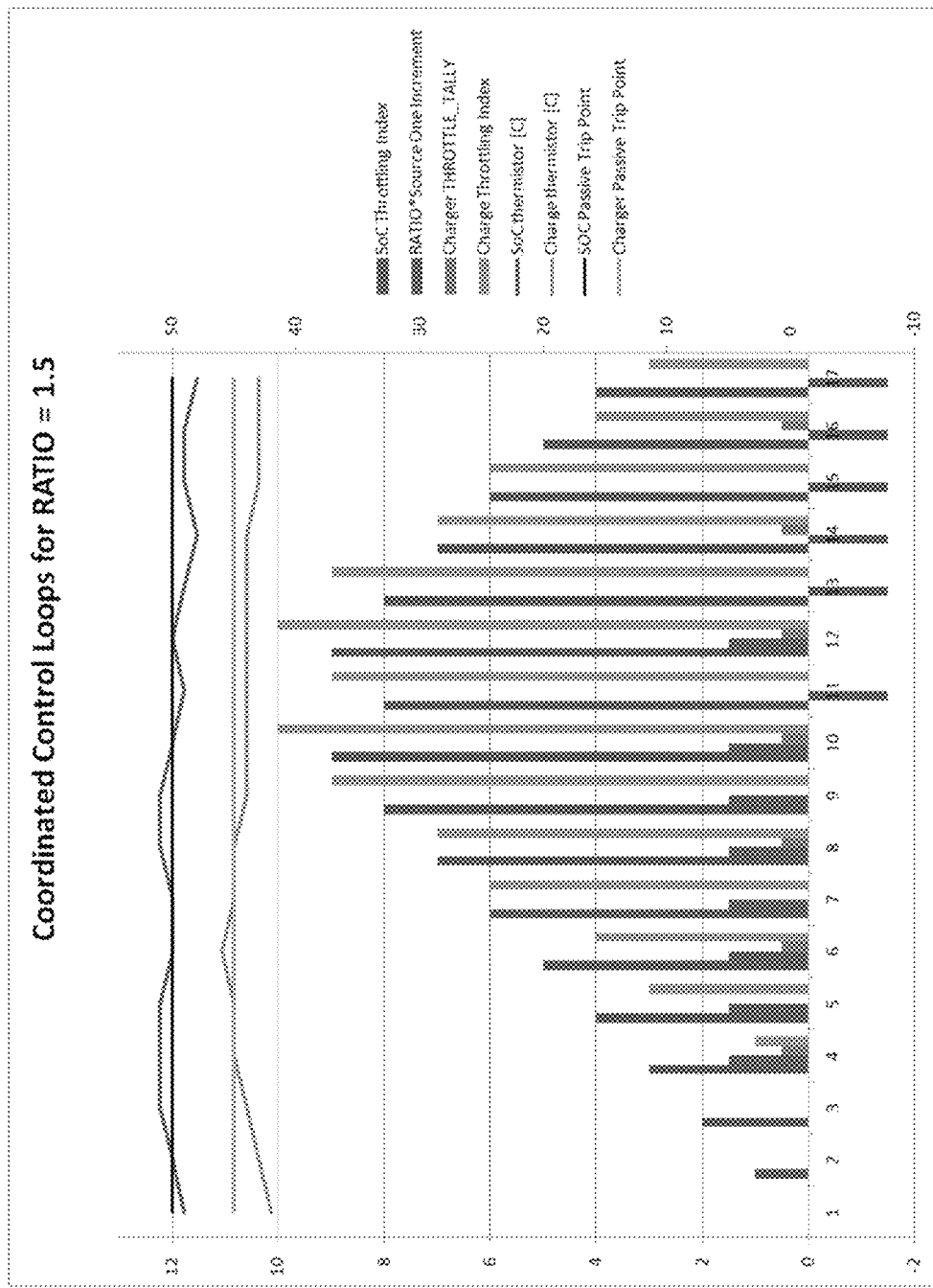

FIG. 5 illustrates a similar example in which the throttle ratio parameter is set to 1:1.5. Table III illustrates operations of the control loop manager over time in the thermal environment.

TABLE III

| Time step | SoC thermistor [C.] | SoC Throttling Index | Charge thermistor [C.] | RATIO* Source One Increment | Charger Throttle Tally | Charge Throttling Index |
|---|---|---|---|---|---|---|
| 1 | 49 | 0 | 42 |  | 0 | 0 |
| 2 | 50 | 1 | 43 | 0 | 0 | 0 |
| 3 | 51 | 2 | 44 | 0 | 0 | 0 |
| 4 | 51 | 3 | 45 | 1.5 | 0.5 | 1 |
| 5 | 51 | 4 | 45 | 1.5 | 0 | 3 |

At time step S the display thermistor hits 45 C and it is determined that the throttle step delta parameter (i.e., the number of p-state throttling steps minus the number of display throttling steps) is 3−1=2. Thus, the control loop manager 230 will attempt to maintain a difference of three steps between the throttle state of the two loops until the last steps of unthrottling to the highest power dissipation, as illustrated in Table IV. The charger throttle state is equal to the integer portion of the throttle ratio parameter multiplied by (SOC throttling state−the throttle step delta)+throttle tally, and any remainder is stored in throttle tally.

TABLE IV

| 6 | 50 | 5 | 46 | 1.5 | 0.5 | 4 |
|---|---|---|---|---|---|---|
| 7 | 50 | 6 | 45 | 1.5 | 0 | 6 |
| 8 | 51 | 7 | 45 | 1.5 | 0.5 | 7 |
| 9 | 51 | 8 | 44 | 1.5 | 0 | 9 |
| 10 | 50 | 9 | 44 | 1.5 | 0.5 | 10 |

The throttle tally is set equal to zero when there is an unthrottling action; this stops carrying forward the throttling action from the previous thermal event.

TABLE V

| 11 | 49 | 8 | 44 | −1.5 | 0 | 9 |
|---|---|---|---|---|---|---|
| 12 | 50 | 9 | 44 | 1.5 | 0.5 | 10 |
| 13 | 49 | 8 | 44 | −1.5 | 0 | 9 |
| 14 | 48 | 7 | 44 | −1.5 | 0.5 | 7 |
| 15 | 49 | 6 | 43 | −1.5 | 0 | 6 |
| 16 | 49 | 5 | 43 | −1.5 | 0.5 | 4 |
| 17 | 48 | 4 | 43 | −1.5 | 0 | 3 |

In this way the two control loops are coordinated. In this case charge current was sacrificed to maintain higher SoC frequency. Note that if the charger reached the end of its throttling range during the example above, the process would continue with the charger at its depth limit until it was unthrottled.

Figure 6:
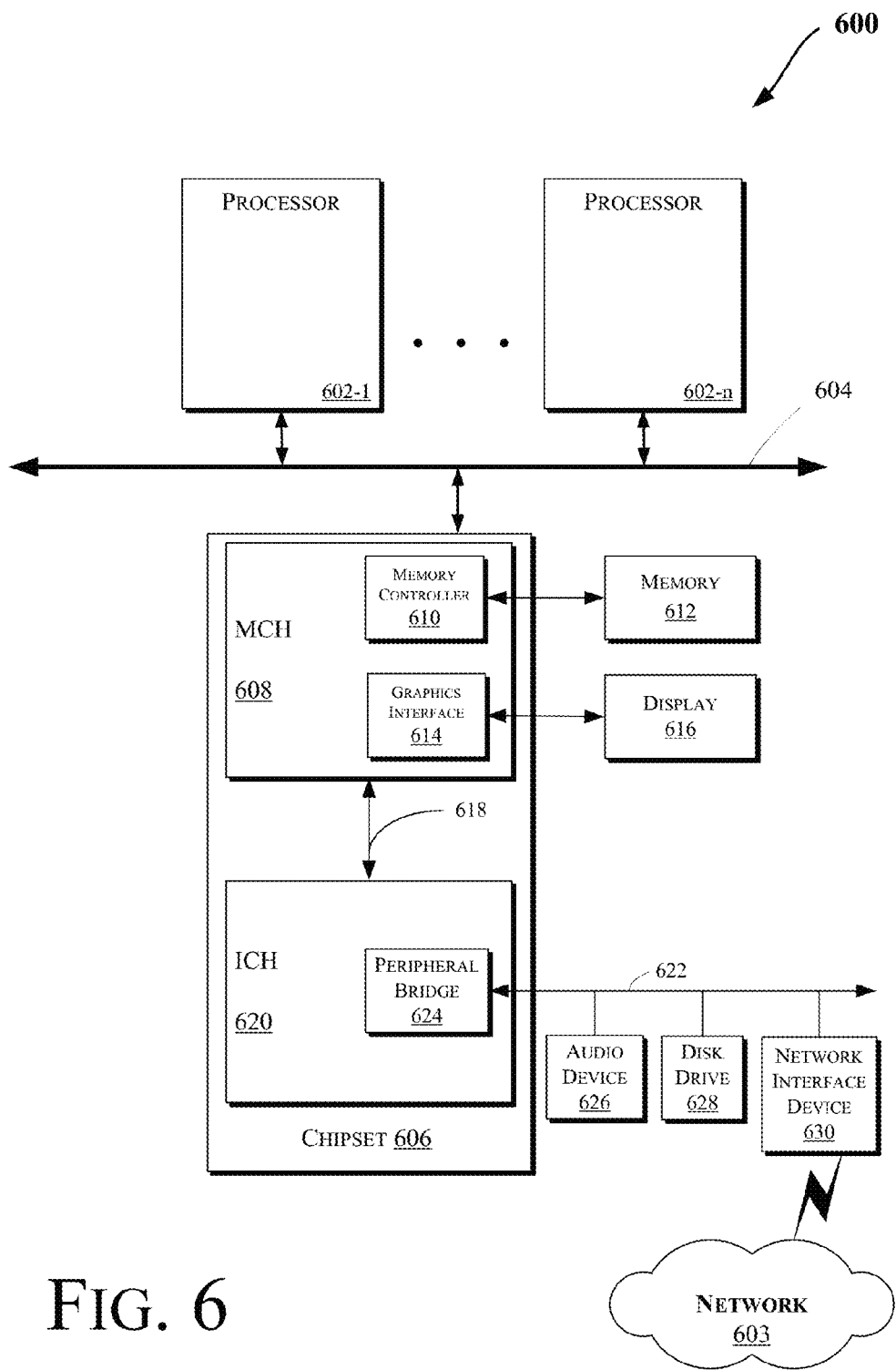
FIGS. 6-10 are schematic illustrations of electronic devices which may be adapted to implement control loops for temperature control in accordance with some examples.

As described above, in some examples the electronic device may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
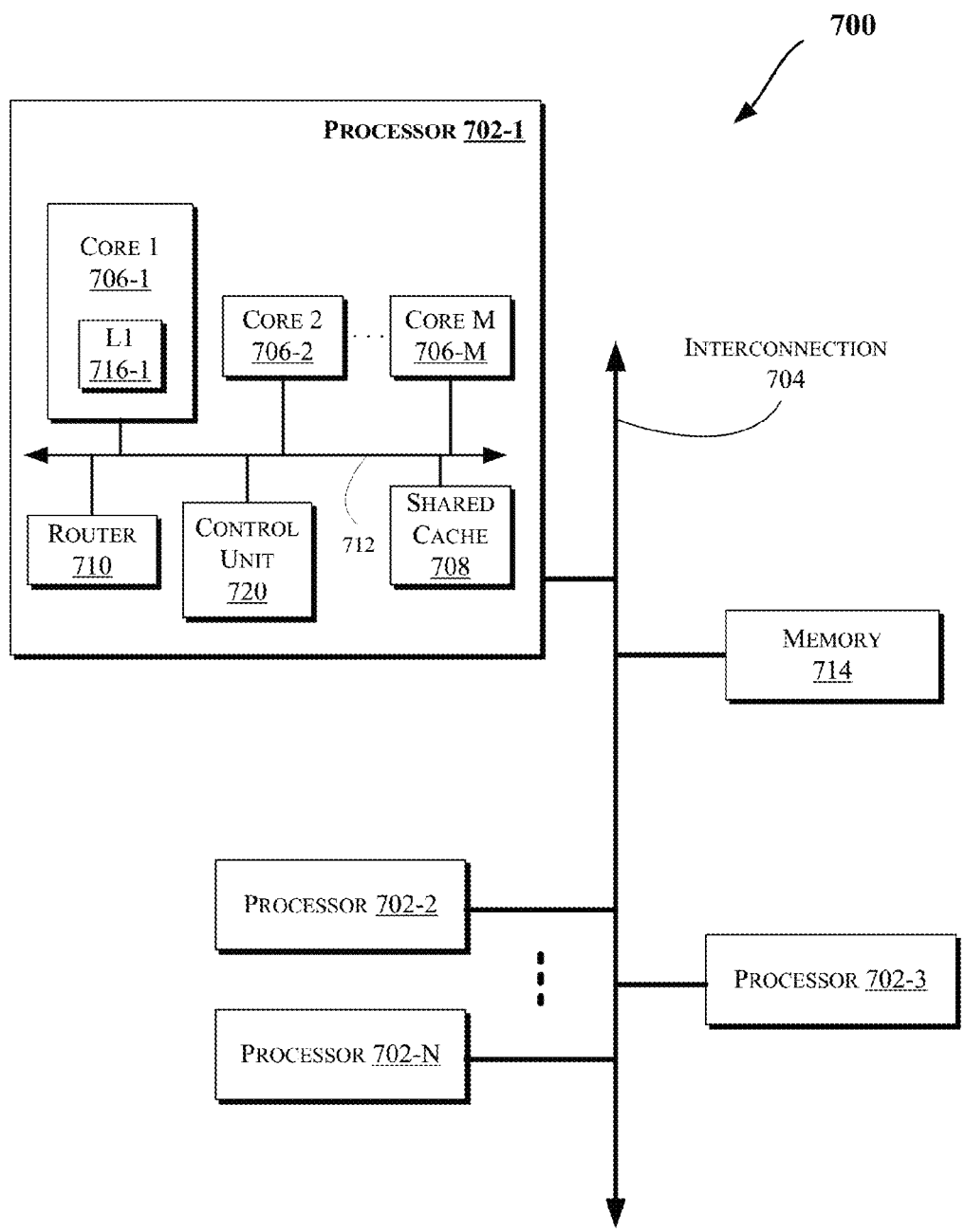

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716"). In one example, the control unit 720 may include logic to implement the operations described above with reference to the memory controller 122 in FIG. 2.

Figure 8:
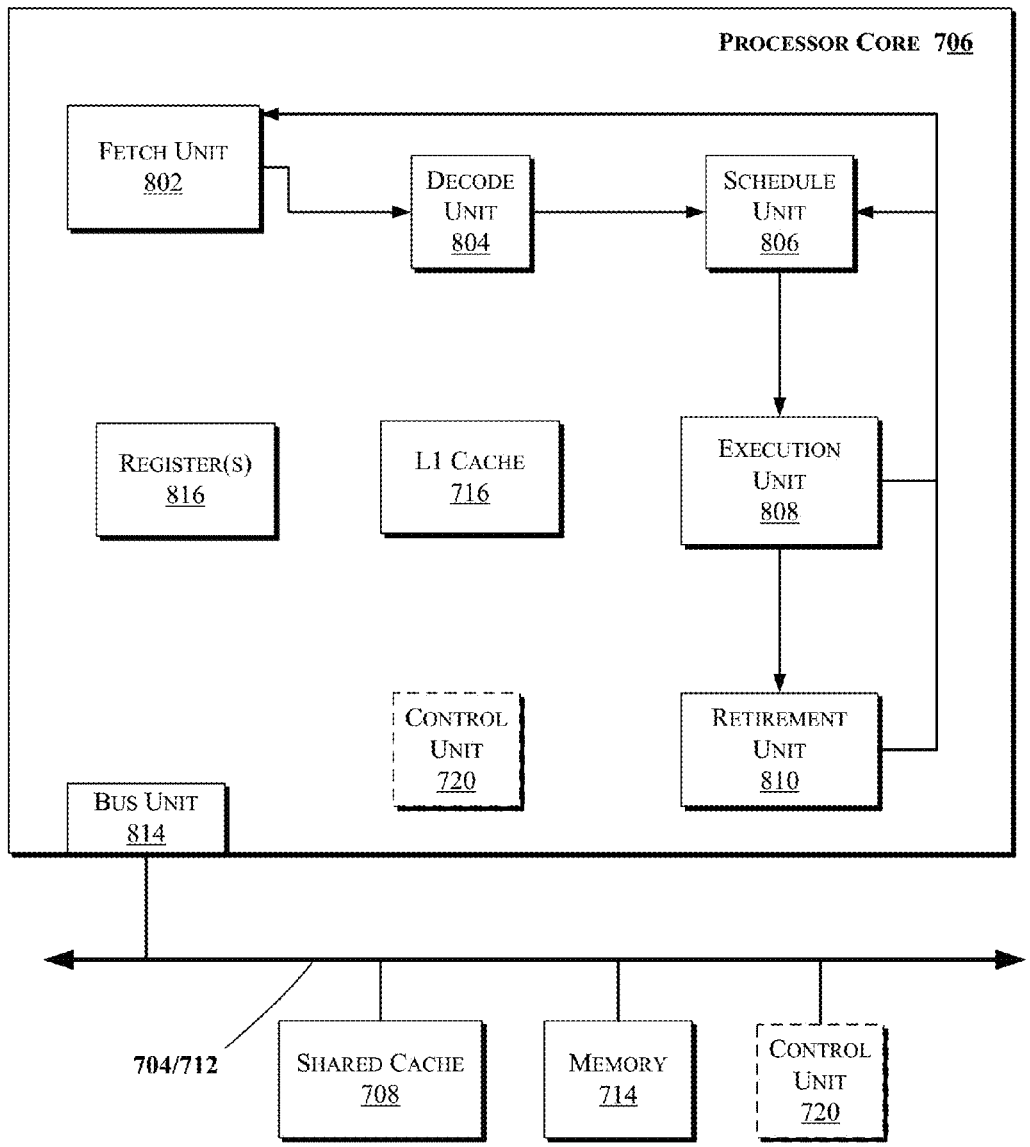

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
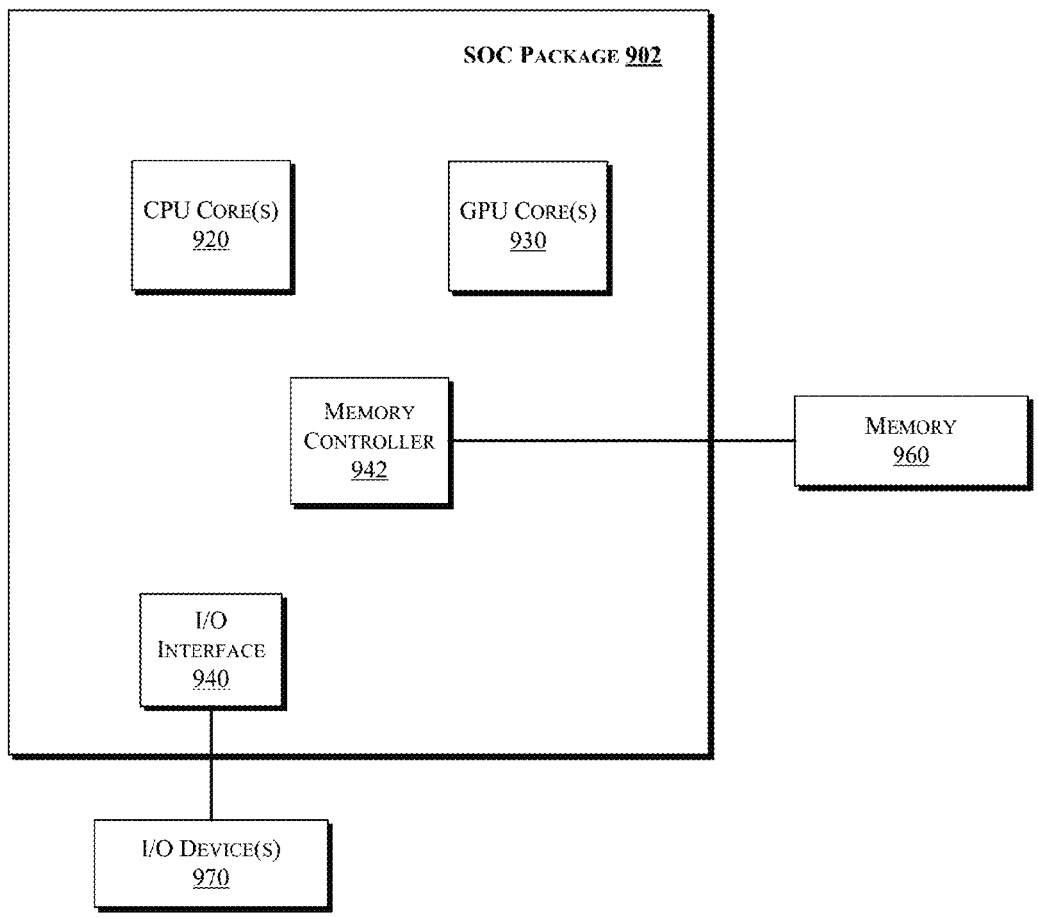

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch surface, a speaker, or the like.

Figure 10:
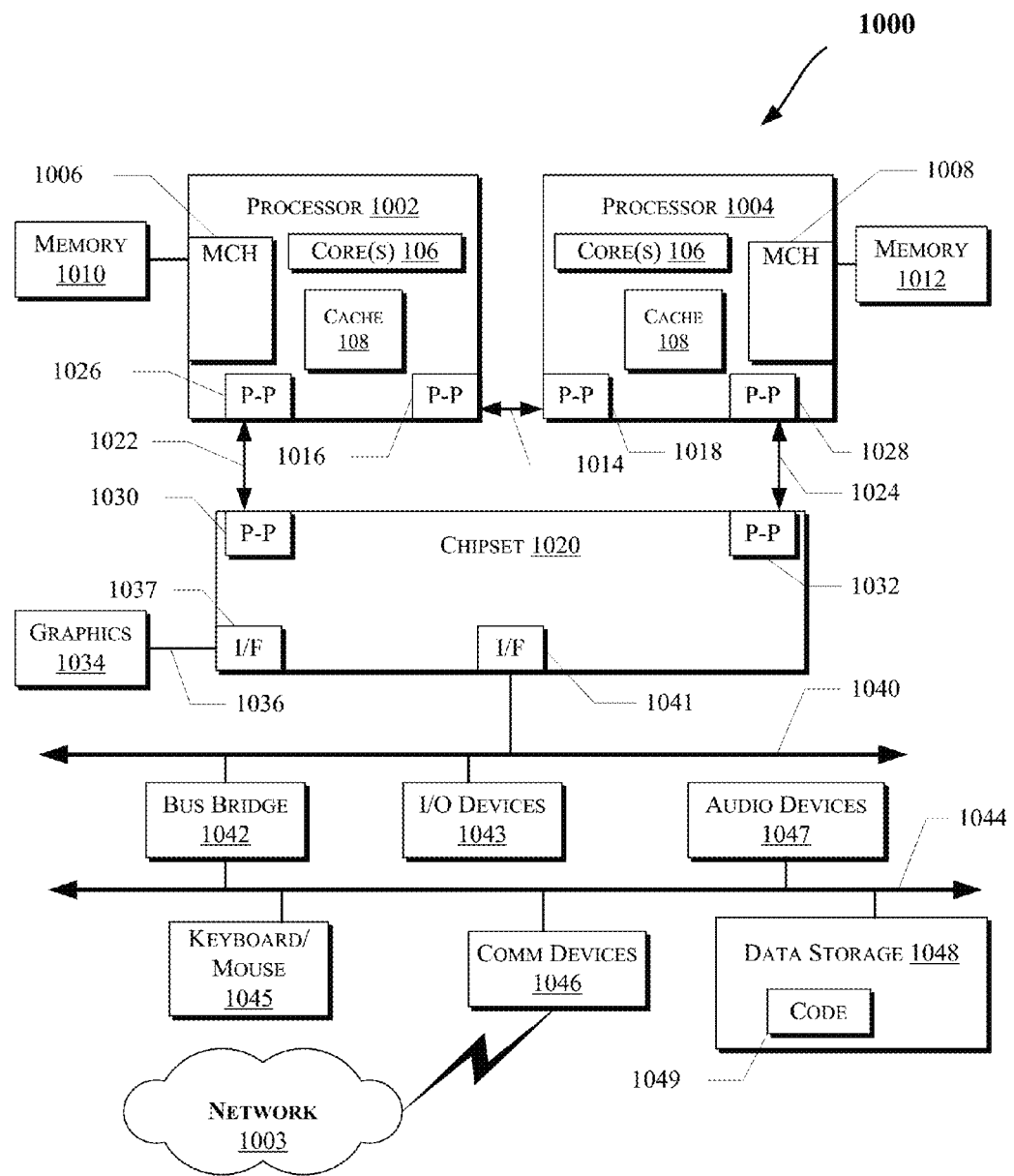

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some examples.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 1004. Other examples, however, may exist in other circuits, logic units, or devices within the system 1000 of FIG. 10. Furthermore, other examples may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further examples.

Example 1 is an apparatus comprising logic, at least partially including hardware logic, configured to define a control relationship between a first control loop associated with a first heat source and a second control loop associated with a second heat source and enforce the control relationship during throttling operations of the first heat source and the second heat source.

In Example 2, the subject matter of Example 1 can optionally include logic further configured to define a throttle ratio parameter between the first heat source and the second heat source.

In Example 3, the subject matter of any one of Examples 1-2 can optionally include logic further configured to activate the first control loop and track a number of throttle steps implemented by the first control loop.

In Example 4, the subject matter of any one of Examples 1-3 can optionally include logic further configured to activate of the second control loop and set a throttle step delta parameter to the number of throttle steps implemented by the first control loop before activation of the second control loop.

In Example 5, the subject matter of any one of Examples 1-4 can optionally include logic further configured to maintain the throttle ratio parameter during throttling operations of the first heat source and the second heat source.

In Example 6, the subject matter of any one of Examples 1-5 can optionally include logic further configured to maintain the throttle step delta parameter during throttling operations of the first heat source and the second heat source.

In Example 7, the subject matter of any one of Examples 1-6 can optionally include logic further configured to maintain a count of incomplete throttling operations.

In Example 8, the subject matter of any one of Examples 1-7 can optionally an arrangement in which the throttling operations comprise at least one of reducing a power level drawn by an electronic component or reducing an operating speed of an electronic component.

In Example 9, the subject matter of any one of Examples 1-8 can optionally an arrangement in which the logic is further configured to maintain the throttle ratio parameter during reverse throttling operations of the first heat source and the second heat source.

In Example 10, the subject matter of any one of Examples 1-9 can optionally an arrangement in which the reverse throttling operations comprise at least one of increasing a power level drawn by an electronic component or increasing an operating speed of an electronic component.

Example 11 is an electronic device comprising at least one heat generating component and a controller comprising logic, at least partially including hardware logic, configured to define a control relationship between a first control loop associated with a first heat source and a second control loop associated with a second heat source and enforce the control relationship during throttling operations of the first heat source and the second heat source.

In Example 12, the subject matter of Example 11 can optionally include logic further configured to define a throttle ratio parameter between the first heat source and the second heat source.

In Example 13, the subject matter of any one of Examples 11-12 can optionally include logic further configured to activate the first control loop and track a number of throttle steps implemented by the first control loop.

In Example 14, the subject matter of any one of Examples 11-13 can optionally include logic further configured to activate of the second control loop and set a throttle step delta parameter to the number of throttle steps implemented by the first control loop before activation of the second control loop.

In Example 15, the subject matter of any one of Examples 11-14 can optionally include logic further configured to maintain the throttle ratio parameter during throttling operations of the first heat source and the second heat source.

In Example 16, the subject matter of any one of Examples 11-15 can optionally include logic further configured to maintain the throttle step delta parameter during throttling operations of the first heat source and the second heat source.

In Example 17, the subject matter of any one of Examples 11-16 can optionally include logic further configured to maintain a count of incomplete throttling operations.

In Example 18, the subject matter of any one of Examples 11-17 can optionally an arrangement in which the throttling operations comprise at least one of reducing a power level drawn by an electronic component or reducing an operating speed of an electronic component.

In Example 19, the subject matter of any one of Examples 11-18 can optionally an arrangement in which the logic is further configured to maintain the throttle ratio parameter during reverse throttling operations of the first heat source and the second heat source.

In Example 20, the subject matter of any one of Examples 11-19 can optionally an arrangement in which the reverse throttling operations comprise at least one of increasing a power level drawn by an electronic component or increasing an operating speed of an electronic component.

Example 21 is a computer program product comprising logic instructions stored on a non-transitory computer readable medium which, when executed by a controller, configure the controller to define a control relationship between a first control loop associated with a first heat source and a second control loop associated with a second heat source and enforce the control relationship during throttling operations of the first heat source and the second heat source.

In Example 22, the subject matter of Example 21 can optionally include logic further configured to define a throttle ratio parameter between the first heat source and the second heat source.

In Example 23, the subject matter of any one of Examples 21-22 can optionally include logic further configured to activate the first control loop and track a number of throttle steps implemented by the first control loop.

In Example 24, the subject matter of any one of Examples 21-23 can optionally include logic further configured to activate of the second control loop and set a throttle step delta parameter to the number of throttle steps implemented by the first control loop before activation of the second control loop.

In Example 25, the subject matter of any one of Examples 21-24 can optionally include logic further configured to maintain the throttle ratio parameter during throttling operations of the first heat source and the second heat source.

In Example 26, the subject matter of any one of Examples 21-25 can optionally include logic further configured to maintain the throttle step delta parameter during throttling operations of the first heat source and the second heat source.

In Example 27, the subject matter of any one of Examples 21-26 can optionally include logic further configured to maintain a count of incomplete throttling operations.

In Example 28, the subject matter of any one of Examples 21-27 can optionally an arrangement in which the throttling operations comprise at least one of reducing a power level drawn by an electronic component or reducing an operating speed of an electronic component.

In Example 29, the subject matter of any one of Examples 21-28 can optionally an arrangement in which the logic is further configured to maintain the throttle ratio parameter during reverse throttling operations of the first heat source and the second heat source.

In Example 30, the subject matter of any one of Examples 21-29 can optionally an arrangement in which the reverse throttling operations comprise at least one of increasing a power level drawn by an electronic component or increasing an operating speed of an electronic component.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A controller, comprising:
   logic, at least partially including hardware logic, configured to:
   define a control relationship between a first control loop associated with a first heat source and a second control loop associated with a second heat source;
   enforce the control relationship during throttling operations of the first heat source and the second heat source;
   define a throttle ratio parameter between the first heat source and the second heat source;
   activate the first control loop;
   track a number of throttle steps implemented by the first control loop;
   activate of the second control loop; and
   set a throttle step delta parameter to the number of throttle steps implemented by the first control loop before activation of the second control loop.

2. The controller of claim 1, wherein the logic is further configured to:
   maintain the throttle ratio parameter during throttling operations of the first heat source and the second heat source.

3. The controller of claim 1, wherein the logic is further configured to:
   maintain the throttle step delta parameter during throttling operations of the first heat source and the second heat source.

4. The controller of claim 3, wherein the logic is further configured to maintain a count of incomplete throttling operations.

5. The controller of claim 1, wherein the throttling operations comprise at least one of:
   reducing a power level drawn by an electronic component; or
   reducing an operating speed of an electronic component.

6. The controller of claim 1, wherein the logic is further configured to maintain the throttle ratio parameter during reverse throttling operations of the first heat source and the second heat source.

7. The controller of claim 6, wherein the reverse throttling operations comprise at least one of:
   increasing a power level drawn by an electronic component; or
   increasing an operating speed of an electronic component.

8. An electronic device, comprising:
   at least one heat generating component; and
   a controller, comprising:
   logic, at least partially including hardware logic, configured to:
   define a control relationship between a first control loop associated with a first heat source and a second control loop associated with a second heat source;
   enforce the control relationship during throttling operations of the first heat source and the second heat source;
   define a throttle ratio parameter between the first heat source and the second heat source;
   activate the first control loop;
   track a number of throttle steps implemented by the first control loop;
   activate of the second control loop; and
   set a throttle step delta parameter to the number of throttle steps implemented by the first control loop before activation of the second control loop.

9. The electronic device of claim 8, wherein the logic is further configured to:
   maintain the throttle ratio parameter during throttling operations of the first heat source and the second heat source.

10. The electronic device of claim 8, wherein the logic is further configured to:
    maintain the throttle step delta parameter during throttling operations of the first heat source and the second heat source.

11. The electronic device of claim 9, wherein the logic is further configured to maintain a count of incomplete throttling operations.

12. The electronic device of claim 8, wherein the throttling operations comprise at least one of:
    reducing a power level drawn by an electronic component; or
    reducing an operating speed of an electronic component.

13. The electronic device of claim 8, wherein the logic is further configured to maintain the throttle ratio parameter during reverse throttling operations of the first heat source and the second heat source.

14. The electronic device of claim 13, wherein the reverse throttling operations comprise at least one of:
    increasing a power level drawn by an electronic component; or
    increasing an operating speed of an electronic component.

15. A computer program product comprising logic instructions stored on a non-transitory computer readable medium which, when executed by a controller, configure the controller to:
    define a control relationship between a first control loop associated with a first heat source and a second control loop associated with a second heat source;
    enforce the control relationship during throttling operations of the first heat source and the second heat source;
    define a throttle ratio parameter between the first heat source and the second heat source;
    activate the first control loop;
    track a number of throttle steps implemented by the first control loop;
    activate of the second control loop; and
    set a throttle step delta parameter to the number of throttle steps implemented by the first control loop before activation of the second control loop.

16. The computer program product of claim 15, wherein the logic is further configured to:
    maintain the throttle ratio parameter during throttling operations of the first heat source and the second heat source.

* * * * *